(12) United States Patent
Ileleji et al.

(10) Patent No.: US 10,746,464 B2
(45) Date of Patent: Aug. 18, 2020

(54) MODULAR COLLAPSIBLE SOLAR DRYER FOR MULTIPURPOSE DRYING

(71) Applicant: Purdue Research Foundation, West Lafayette, IN (US)

(72) Inventors: Klein Erhekabor Ileleji, Carmel, IN (US); Jesumayomikun Adegoke Olasubulumi, Lafayette, IN (US); Diana Milena Ramirez Gutierrez, Bogota (CO)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 0 days.

(21) Appl. No.: 15/751,241

(22) PCT Filed: Aug. 12, 2016

(86) PCT No.: PCT/US2016/046803
§ 371 (c)(1),
(2) Date: Feb. 8, 2018

(87) PCT Pub. No.: WO2017/027813
PCT Pub. Date: Feb. 16, 2017

(65) Prior Publication Data
US 2018/0231308 A1    Aug. 16, 2018

Related U.S. Application Data

(60) Provisional application No. 62/203,994, filed on Aug. 12, 2015.

(51) Int. Cl.
*F26B 3/32* (2006.01)
*F26B 3/28* (2006.01)
(Continued)

(52) U.S. Cl.
CPC ............ *F26B 3/28* (2013.01); *A23N 12/08* (2013.01); *F26B 9/003* (2013.01); *F26B 9/06* (2013.01);
(Continued)

(58) Field of Classification Search
CPC .. F26B 3/28; F26B 3/283; F26B 3/286; F26B 9/003; F26B 9/06; F26B 25/14;
(Continued)

(56) References Cited

U.S. PATENT DOCUMENTS 4,099,338 A * 7/1978 Mullin ............... F26B 3/286
126/616
4,221,059 A    9/1980 Everitt
(Continued)

FOREIGN PATENT DOCUMENTS

CN    204047824 U  * 12/2014

OTHER PUBLICATIONS

International Search Report for PCT/US2016/046803 dated Oct. 24, 2016.
(Continued)

*Primary Examiner* — John P McCormack
(74) *Attorney, Agent, or Firm* — Thomas|Horstemeyer, LLP

(57) ABSTRACT

A solar dryer system, including an upper thermal collection unit including a plurality of tiers of thermal radiation collection panels, where a vent is disposed between adjacent ones of the tiers of the thermal radiation collection panels. The solar dryer system can include a chamber disposed between the upper thermal collection unit and a base, where the chamber is configured to receive an object for a drying process using the dryer system. The solar dryer system can
(Continued)

also include at least one fan disposed within the chamber and coupled to the base to provide circulation for the drying process.

17 Claims, 6 Drawing Sheets

(51) Int. Cl.
 *A23N 12/08* (2006.01)
 *F26B 9/06* (2006.01)
 *F26B 21/10* (2006.01)
 *F26B 25/06* (2006.01)
 *F26B 9/00* (2006.01)
 *F26B 21/08* (2006.01)
 *F26B 25/14* (2006.01)

(52) U.S. Cl.
 CPC .............. *F26B 21/08* (2013.01); *F26B 21/10* (2013.01); *F26B 25/06* (2013.01); *F26B 25/14* (2013.01)

(58) Field of Classification Search
 CPC .......... F26B 25/06; F26B 21/08; F26B 21/10; A23N 12/08
 USPC ..................................... 34/522, 93, 266, 275
 See application file for complete search history.

(56) References Cited

U.S. PATENT DOCUMENTS

| | | | |
|---|---|---|---|
| 4,263,721 A | 4/1981 | Danford | |
| 4,432,147 A * | 2/1984 | Chen | F26B 3/286 34/542 |
| 4,490,926 A | 1/1985 | Stokes | |
| 5,001,846 A | 3/1991 | Andrassy | |
| 6,202,321 B1 | 3/2001 | Soucy | |
| 6,922,908 B1 | 8/2005 | Raudales | |
| 8,851,560 B1 * | 10/2014 | Freeman | B60L 58/14 296/210 |
| 8,984,704 B2 * | 3/2015 | Saraf | B08B 1/008 15/246 |
| 9,035,271 B2 * | 5/2015 | Wilson | B05D 3/067 250/504 H |
| 2006/0076008 A1 * | 4/2006 | Kerr | F24S 20/63 126/638 |
| 2007/0256318 A1 * | 11/2007 | Sugawara | F26B 3/286 34/93 |
| 2011/0056146 A1 * | 3/2011 | Appert | B60P 3/34 52/79.1 |
| 2011/0238223 A1 * | 9/2011 | Narayanamurthy | F24F 5/0046 700/277 |
| 2011/0308101 A1 * | 12/2011 | Wisherd | D06F 58/26 34/255 |

OTHER PUBLICATIONS

Ileleji, K.E., C. Alexander. T. Okoror, M. Dutta and J. Ricker-Gilbert. (2012) Development of Purdue improved drying stove (PIDS) for grain drying. Purdue Improved Crop Storage Workshop, Apr. 10-12, Accra, Ghana.

FAO/World Bank, FAO/World Bank workshop on reducing post-harvest losses in the grain supply chain in Africa. Mar. 18-19, 2010. FAO Headquarters, Rome, Italy.

The World Bank/FAO/NRI, "Missing Food: The Case of Postharvest Grain Losses in Sub-Saharan Africa," Report No. 60371-AFR, Apr. 2011.

* cited by examiner

MODULAR COLLAPSIBLE SOLAR DRYER FOR MULTIPURPOSE DRYING

CROSS-REFERENCE TO RELATED APPLICATIONS

This application is the 35 U.S.C. § 371 national stage application of PCT Application No. PCT/US2016/046803, filed Aug. 12, 2016, where the PCT claims priority to U.S. Provisional Patent Application No. 62/203,994 entitled "Modular Collapsible Solar Dryer for Multipurpose Drying Needs," filed on Aug. 12, 2015, both of which are herein incorporated by reference in their entireties.

STATEMENT REGARDING FEDERALLY SPONSORED RESEARCH OR DEVELOPMENT

This invention was made with government support under AID-OAA-L-14-00003 awarded by the United States Agency for International Development. The government has certain rights in the invention.

TECHNICAL FIELD

The present disclosure generally relates to solar dryers, and in particular to a modular collapsible solar dryer for multipurpose drying applications.

BACKGROUND

This section introduces aspects that may help facilitate a better understanding of the disclosure. Accordingly, these statements are to be read in this light and are not to be understood as admissions about what is or is not prior art.

For cereal grains, the quantitative value of post-harvest losses (PHL) in sub-Saharan Africa is estimated at more than USD 4 billion annually. Huge losses are also incurred and probably a lot higher in perishables (fresh fruits and vegetables). The lack of affordable drying technology to meet the needs of both small and medium scale farmers is one of the major reasons why this problem still exists. Food loss is an often forgotten major contributor to food insecurity. Further, food losses cause a waste of resources including land, water, energy, agricultural inputs, and human labor that are used in production of the lost food. This has a significant negative impact on climate, the environment, and livelihoods of those involved. Data show that the lack of a low-cost effective drying technology was the single limiting factor causing high PHL, high aflatoxin contamination and low agricultural productivity in the major maize production regions in Ghana. Findings confirmed the need to focus on developing a low-cost farmer-owned drying technology for grain crops grown in this region. The findings are quite similar to regions in the humid tropics of Africa, Asia, and the Americas where crop harvest coincides with the rainy season, making open-air sun drying a challenge. Open air sun drying on roof tops, tarps, concrete pavements and tared roads has been practiced for decades and still remains the major method used by smallholder farmers for drying crops. While open-air sun drying is a cheap method for drying, it unfortunately depends on the use of a large area and favorable weather. It is labor intensive and leads to product quality degradation during drying and contamination by fecal matter and dust from livestock and vehicles, respectively. As of yet, there has been no innovative technology that has been widely adopted for use by smallholder farmers.

There is therefore an unmet need for widely scalable drying solutions for multiple drying applications.

SUMMARY

One aspect of the disclosure encompasses embodiments of a dryer system, comprising: an upper thermal collection unit comprising a plurality of tiers of thermal radiation collection panels, wherein a vent is disposed between adjacent ones of the tiers of the thermal radiation collection panels; a chamber disposed between the upper thermal collection unit and a base, wherein the chamber is configured to receive an object for a drying process using the dryer system; and at least one fan disposed within the chamber and coupled to the base to provide circulation for the drying process.

In some embodiments of this aspect of the disclosure, the vent comprises a thermal collector inlet and a chamber inlet forming a flow channel between adjacent ones of the tiers of the thermal radiation collection panels resulting in a reduction of air pressure and increase in airflow from the chamber inlet to the chamber.

In some embodiments of this aspect of the disclosure, the at least one fan is a plurality of fans; a first subset of the plurality of fans are positioned at the backside of the solar dryer to provide a cooling effect; and a second subset of the plurality of fans are positioned at a front of the solar dryer and at a base of the solar dryer to provide a heating effect.

In some embodiments of this aspect of the disclosure, the dryer system further comprises a plurality of wheels coupled to the base to provide mobility to the dryer system.

In some embodiments of this aspect of the disclosure, the dryer system further comprises at least one transparent cover configured to enclose the chamber.

In some embodiments of this aspect of the disclosure, the thermal radiation collection panels comprise polycarbonate and aluminum black body.

In some embodiments of this aspect of the disclosure, the dryer system further comprises a power supply comprising a photovoltaic panel disposed on at least one of the plurality of tiers of thermal radiation collection panels and at least one battery coupled to the photovoltaic panel.

In some embodiments of this aspect of the disclosure, the upper thermal collection unit comprises: a first substantially triangular stepped side coupled to a second substantially triangular stepped side via the thermal radiation collection panels; and wherein an upper portion of the first substantially triangular stepped side and the second substantially triangular stepped side is higher than a lower portion of the first substantially triangular stepped side and the second substantially triangular stepped side.

In some embodiments of this aspect of the disclosure, the upper thermal unit is configured to collapse into at least a portion of the chamber to reduce a volume of the chamber.

In some embodiments of this aspect of the disclosure, the dryer system further comprises an electronic controller, the electronic controller comprising processing circuitry that: identifies a temperature and relative humidity of the chamber from a temperature and a relative humidity sensor; and controls power provided to the at least one fan based at least in part on the temperature of the chamber.

In some embodiments of this aspect of the disclosure, the dryer system further comprises a push bar handle coupled to a frame of the dryer system at an upper portion of the dryer system.

In some embodiments of this aspect of the disclosure, the dryer system further comprises at least one drying tray, the drying tray configured to be exposed to the at least one fan.

Another aspect of the disclosure encompasses embodiments of a method comprising: placing an object in a chamber of a drying system disposed between an upper thermal collection unit and a base, the chamber being configured to receive at least one object for a drying process using the dryer system, wherein the upper thermal collection unit comprises a plurality of tiers of thermal radiation collection panels, wherein a vent is disposed between adjacent ones of the tiers of the thermal radiation collection panels; controlling at least one fan disposed within the chamber and coupled to the base to provide circulation for the drying process.

In some embodiments of this aspect of the disclosure, a plurality of fans are disposed in the base of the drying system to evacuate air from the chamber and draw in air from outside the drying system through the vent and across the thermal radiation collection panels to heat the air.

In some embodiments of this aspect of the disclosure, the at least one object for drying is placed on a drying tray and exposed to at least one fan.

In some embodiments of this aspect of the disclosure, the method further comprises placing a plurality of trays containing at least one object in a stacked configuration to allow air flow to the at least one object.

In some embodiments of this aspect of the disclosure, heating is elevated by reducing the volume of the chamber.

In some embodiments of this aspect of the disclosure, the volume is reduced by collapsing the upper thermal unit into at least a portion of the chamber.

In some embodiments of this aspect of the disclosure, the method further comprises identifying at least one of a temperature measurement and a relative humidity value by at least one sensor; and controlling power provided to the at least one fan based at least in part on at least one of the temperature and relative humidity value of the chamber.

In some embodiments of this aspect of the disclosure, the operational temperature is from about 30° C. (86° F.) to about 80° C. (176° F.).

DETAILED DESCRIPTION

Figure 1:
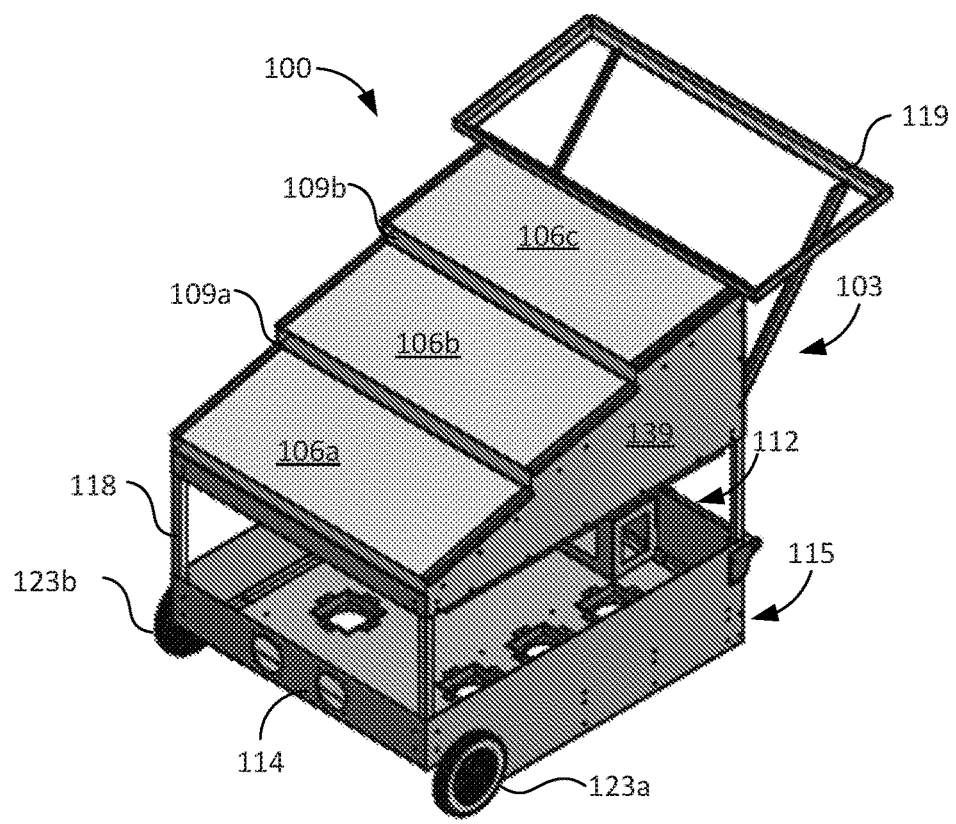
FIG. 1 is an isometric view of a front and a side of a modular scalable solar dryer for multipurpose drying according to various embodiments of the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

The device and system described herein provides users with an affordable and reliable high-technology drying solution for agricultural crops (cereals, grains, oilseeds, nuts, fruits and vegetables, cocoa, coffee, processed foods, etc.) and produce, fish and meat and other high-moisture perishables with target to meet the needs of small- and medium-holder farmers and agroprocessors in the humid tropics in Africa, Latin America and Asia, as well as small farmers in Europe and North America. It also provides a low-cost and affordable technology power by renewable energy when the drying system is not in use.

This disclosure relates to a modular scalable solar dryer for multipurpose drying of a wide range of products, including grains, pulses and oilseeds, fruits and vegetables, tubers, spices, herbs, processed foods and feed, cash crops like cocoa, coffee, tea, and sheanuts, as well as household items including laundry. The modular scalable solar dryer provides small- and medium-holder farmers, and agroprocessors in developing countries with a way of drying crops and other products in the humid tropics of Africa, Asia, and the Americas, currently incurring billions of dollars yearly in post-harvest losses of harvested crops due to the lack of affordable and reliable drying technologies in these regions. However, it is also applicable to other regions of the world where low-cost dehydration of crops may be warranted. The solar dryer described herein facilitates set-up and stowage during a variety of drying applications, and reconfiguration for application to a variety of crops where drying can be conducted by hanging crops in the drying chamber, such as grapes, or spreading on installed racks or trays on thin-layer or thick-layer beds, as in the case of granular materials, sliced fruits and vegetables, etc. In other aspects, it can also be configured for use in drying crops and agricultural produce, fish and meat products, and household laundry items. The solar dryer provides functionality for rural and urban dwellers in developed countries. The drying unit can be powered 100% by solar energy, battery, or a combination thereof, to generate and circulate hot air passively or actively by convection, direct sunlight radiation, and radiation modes of heat transfer. Heat transfer and distribution in the drying chamber is enabled by photovoltaic powered fans installed on the floor, front wall, or other suitable location of the dryer. Depending on drying capacity needs (drying chamber volume) and crops, other installations of fans at the sides or floor of the dryer are also possible. Fans installed at the back of the dryer are for cooling by bringing ambient air directly into the drying chamber in environments where the solar loads could cause temperatures to be very high and detrimental for drying heat sensitive crops. The cooling fans will be controlled by a microcontroller in communication with one or more temperature and relative humidity (RH) sensors.

The disclosed device and system represents innovative solutions provided in a portable, modular compact design to meet the drying needs of a wide range of agricultural, food, feed and fiber crops, as well as household laundry and other items by harnessing solar energy in a simple and efficient approach. In one aspect, the dryer is novel compared to other solutions offered to small and medium-holder farmers, and agroprocessors because it first provides a highly versatile unit for a wide range of application, thus increasing the value of the investment in the drying unit. Other approaches focus on the design of drying equipment for a few ranges of crops, with limited flexibility of use. The dryer can be designed for mass manufacturing of thousands of units with the goal of decreasing the cost per unit and thus the cost to consumers. It can also be designed for use in both rural and urban settings and a wide range of urban household applications, especially in countries with high electric energy costs, where the use of clothes dryers are prohibitive, with residents preferring drying laundry in the open-air sun drying. Countries such as China, Japan, many countries in Africa and the Americas fall into this category. The dryer is configured to dry laundry faster than open-air sun drying and protect laundry from inclement weather should the owner not be around to remove clothes during a rainfall event. The technology is collapsible to reduce drying chamber volume and thus increase drying temperature and air turnover for increased rate of drying. Collapsing the dryer can also be used in stowage configuration. The drying trays or baskets can be used in the dryer. The trays can stack one on top of the other or be racked inside the dryer. The trays or baskets can be made of any suitable material that can withstand temperatures to which they be exposed when used in the dryer of the disclosure. The trays, baskets, and the like can be a container having a perforated base and may further comprise perforated sides that enable the flow of warm air in both directions (top and bottom) through the product that is spread on the tray to be dried. This flow of air to the product in all directions provide a faster and superior drying rate compared with laying the product on a tarp, pan or ground to dry.

A drying temperature in the drying chamber of the dryer can be controlled by a controller connected to at least one sensor, such as a temperature or relative humidity (RH) sensor, or a combination thereof. The controller can be mechanical, electrical, or electro-mechanical. The controller can have knobs or buttons to adjust drying settings/modes. Some embodiments can have an electronic microcontroller having, for example, a microprocessor, connectors for input and output devices, such as temperature and RH sensors, Bluetooth® connectivity, USB ports for charging cell phones, iPods, iPads or other low powered electronic devices, knobs or buttons to adjust drying settings/modes, a touch screen or an LCD display screen to view temperature and RH as well as the status of the dryer. In various embodiments, functionality of the microcontroller can be implemented or otherwise controlled by an operator using a client application executable on a client device, such as a mobile application on a smartphone or a tablet.

The high-efficiency solar dryer can be communicatively coupled to a supplier and processor network. The communicative coupling can be accomplished via a smartphone or other computing device communicating with the high-efficiency solar dryer. To accommodate the communicative coupling, the high-efficiency solar dryer can include ports for permitting either hard wiring or wireless communication between the dryer and the smartphone or computer. This can include features that include, but are not limited to, USB ports for smartphone charging and connection, Bluetooth® connectivity, and cloud-computing connectivity.

In addition, the items that can be dried using the herein disclosed solar dryer can include, but are not limited to, maize or similar grains and cereals, processed cereals, tubers, fruits, vegetables, herbs, spices, cocoa, coffee, oilseeds, fish, and other types of meat. The solar dryer is not limited to drying food items, thus can be used to dry other items, such as articles of clothing, feed for livestock, or agricultural materials.

The dryer design presented herein comprises the following elements to increase drying efficiency, which include increased airflow and distribution throughout the drying chamber, increased temperature and distribution throughout the drying chamber, and reduced relative humidity of the drying air encountered by the dried product.

Figure 2:
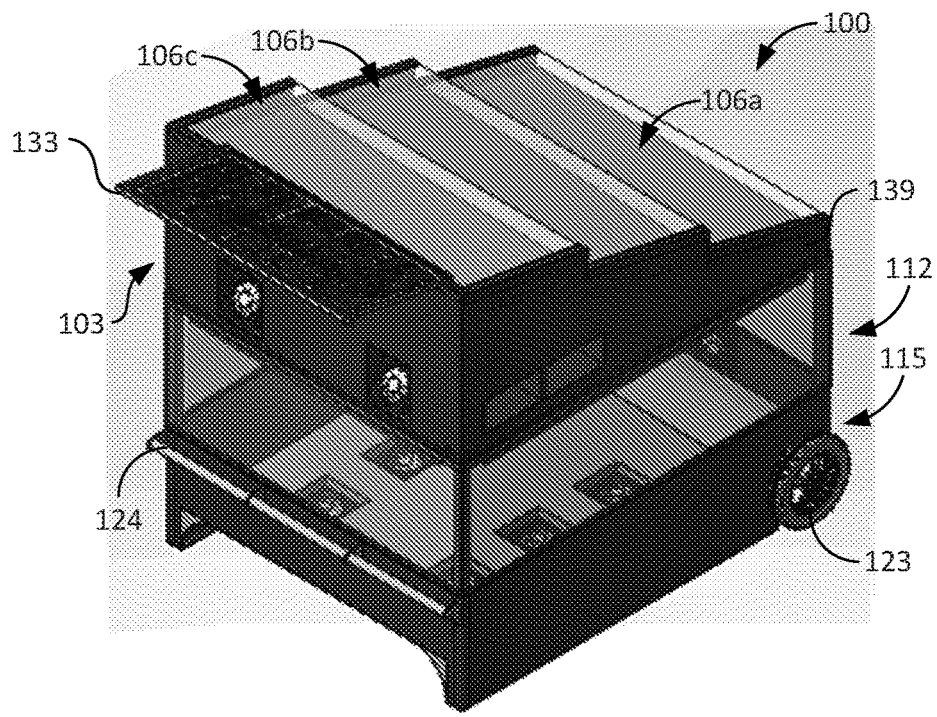
FIG. 2 is an isometric view showing a back and a side of the modular scalable solar dryer of FIG. 1 according to various embodiments of the present disclosure.

Referring now to FIGS. 1 and 2, an embodiment of the solar dryer system 100 is shown in an operational configuration. The operational configuration can include, for example, configuration of the solar dryer system 100 to dry items, such as produce. In the embodiments of FIGS. 1 and 2, the solar dryer 100 can include an upper thermal collection unit 103 having a plurality of tiers of thermal radiation collection panels 106, where a vent 109 is disposed between adjacent ones of the tiers of the thermal radiation collection panels 106. The vent 109 comprises a thermal collector inlet 107 and a drying chamber inlet 108, where the thermal collector inlet 107 has a larger cross-section than the drying chamber inlet 108, creating a venturi-shaped flow channel. The constriction in the flow channel of the thermal collector reduces air pressure that results when air flows through a constricted section, providing an effect of increased airflow from the thermal collector inlet 107 to the drying chamber inlet 108.

A drying chamber 112 can be disposed between the upper thermal collection unit 103 and a base 115, where the drying chamber 112 is configured to receive an object for a drying process using the solar dryer 100.

At least one fan 121 can be disposed within the drying chamber 112 and coupled to the base 115 to provide circulation for the drying process. In some aspects, the solar dryer 100 can have a plurality of wheels 123 coupled to the base 115 to provide mobility to the solar dryer 100. In some aspects, the solar dryer 100 can have a push bar 124. For example, it can be attached to the base 115 or other suitable area to position the solar dryer 100. In other aspects, the push bar 124 can be configured to pull or tow the solar dryer 100, for example, using an animal or suitable vehicle.

In various embodiments, the upper thermal collection unit 103 and the base 115 of the solar dryer 100 can be constructed from sheet metal, steel, aluminum, composite, fiber reinforced plastic, or other material suitable for high-heat operation. The upper thermal collection unit 103 and the base can be held in position by support legs 117. The upper thermal collection unit 103 and the base 115 are coupled with support legs 117. The support leg 117 can be hollow or solid and have a square cross section or other suitable shape. The support leg 117 can be made of any material having sufficient strength to support the upper thermal collection unit 103, such as, but not limited to, steel, aluminum, pultruded reinforced fiber plastic tubes, or other suitable material. In some aspects, the support legs 117 can be inserted into pockets formed in each corner of the base 115 and corresponding pockets formed in each corner of the upper thermal unit 103. In other aspects, the support legs 117 can be hinged.

In some embodiments, the thermal radiation collection panels 106 can be substantially rectangular and otherwise configured in a tiered orientation. The thermal radiation collection panels 106 can each be made from polycarbonate, plexiglass, or similar durable plastic material and a metal such as steel or aluminum and, in some embodiments, can be painted a dark color, such as matte black, for heat absorption. Preferably, a thermal absorbing material applied to the panels 106 or the material of which the panel 106 is constructed is non-reflective.

In one embodiment, the solar dryer 100 includes at least one transparent cover 127 configured to enclose the drying chamber 112 in its operational configuration. Each transparent cover 127 can be sized to cover a side of the open drying chamber 112 disposed between the upper thermal collection unit 103 and the base 115. For example, the transparent cover 127 can be attached on each side of the solar dryer 100 on the side the upper thermal collection unit 103 along the lower edge 125 and the side of the base 115 along the upper edge 126. In some embodiments, the transparent cover 127 can be a flexible curtain or rigid panel. In another embodiment, the cover 127 can be made from a certain translucent material that will enable selective blocking out of certain UV and visible radiation bands from entering the drying chamber 112 or prevent direct solar radiation into the drying chamber by using curtains made of shade cloth.

Figure 3:
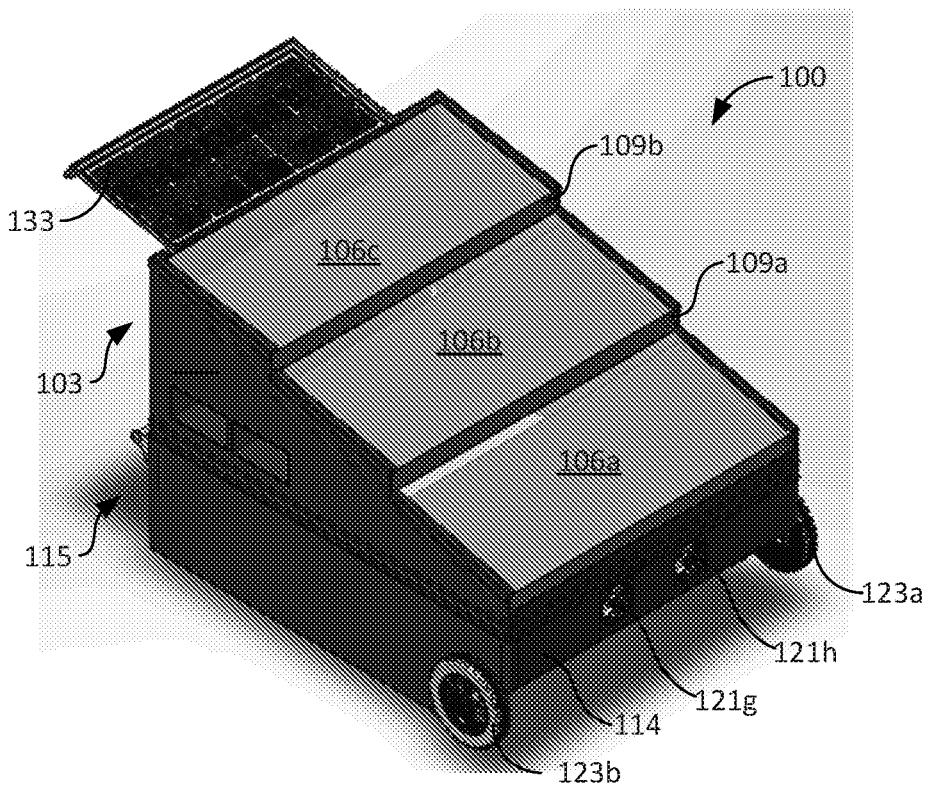
FIG. 3 is an isometric view of a front and a side of the modular scalable solar dryer of FIG. 1 when in a high-temperature operational and stowage configuration according to various embodiments of the present disclosure.
Figure 4:
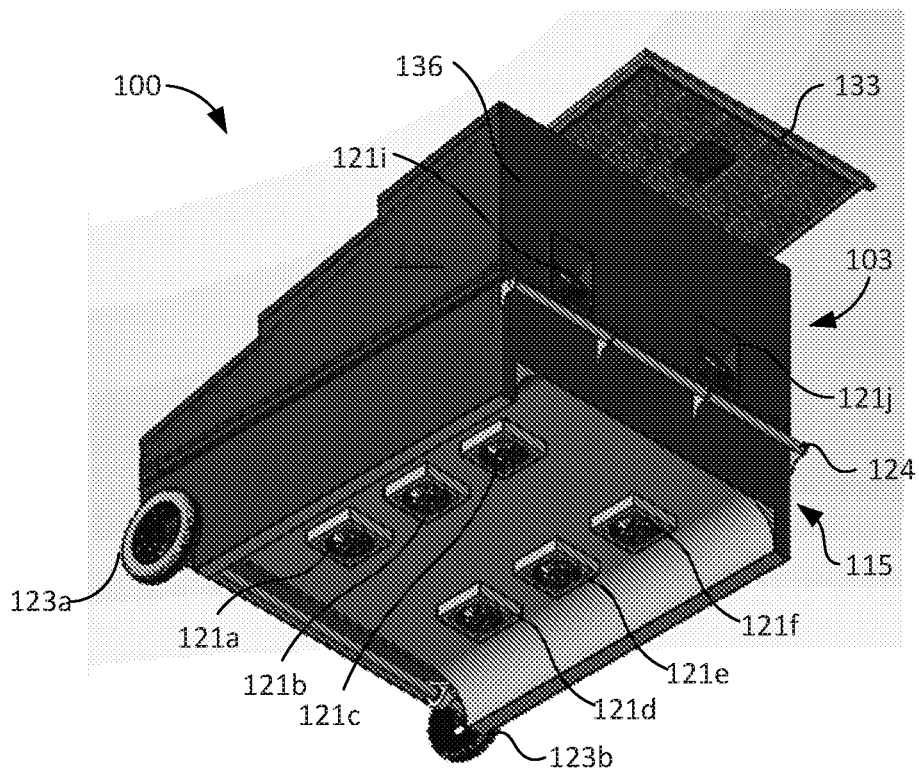
FIG. 4 is an isometric view from the bottom of a back and a side of the modular scalable solar dryer of FIG. 1 when in a high-temperature operational and stowage configuration according to various embodiments of the present disclosure.

Referring next to FIGS. 3 and 4, an alternate configuration of the solar dryer 100 for high temperature operation or storage is shown. This configuration shows the upper thermal collection unit 103 collapsed to rest on the base 115, for example, by adjusting or removing a portion of the support legs 117. For example, the more compact arrangement reduces the volume of the drying chamber 112, while still operational. The drying chamber volume reduction can result in a temperature increase and the rate of air flow exchange in the drying chamber 112. The more compact size also makes it easier to store the solar dryer.

In various embodiments, a power supply 130 comprising a photovoltaic panel 133 can be disposed on at least one of the plurality of tiers of thermal radiation collection panels 106 and can include at least one battery coupled to the photovoltaic panel 133. For example, an embodiment of the dryer system 100 without a photovoltaic panel 133 can be seen with respect to FIG. 1 while FIG. 2 shows an embodiment of the dryer system 100 with a photovoltaic panel 133. The photovoltaic panel 133 can be positioned on any one of the tiered thermal radiation collection panels 106 and extending outward from the back side 136 of the solar dryer 100, or from any other suitable location. In some aspects, the photovoltaic panel 133 can be coupled to the support structure 119. In some aspects, the support structure 119 can be hinged to be folded when in stowage configuration. The power supply 130 can be used to power the at least one fan 121.

A fan 121 can include a high air flow of at least about 70 cubic feet per minute (CFM) or more. In some embodiments, the fans 121 can be positioned at the base 115 located at the bottom of the solar dryer 100, in the front side 114 of the base 115, and/or the back side 136 of the upper thermal collection unit 103. For example, there can be one or more fans 121 in the bottom of the base 115. Embodiment of the solar dryer 100 of the disclosure can include a plurality fans in the base at the bottom or sides. In one embodiment (FIG. 4), fans 121*a-f* in the bottom of the base 115. For example, there can be one or more fans 121*g-h* in the front side 114 of the base 115. In such a configuration, air can be pulled from the top through the stepped thermal collectors into the drying chamber, thus pulled down through the trays containing product, and vented out using the fans located on the bottom base and front or other sides of the dryer. In another aspect, there can be one or more fans 121*i-j* located in the back side 136 of the upper thermal collection unit 103. Fans positioned at the upper back section of the solar dryer can be used to pull ambient air into the drying chamber, thereby cooling the heat load and reducing the chamber temperature. In some embodiments, the solar dryer 100 can include ten or more fans 121 used in the solar dryer 100, although, in other embodiments, other suitable amounts of fans 121 can be employed. In other embodiments, there can be between 1 and 10 fans 121 in the solar dryer 100.

For example, fans installed at the back of the dryer can be used to for cooling by bringing ambient air directly into the drying chamber in environments where the solar loads could cause temperatures to be very high and detrimental for drying heat sensitive crops. The cooling fans can be controlled by a microcontroller in communication with one or more relative humidity (RH) sensors as moisture is evaporated from the dried product. The RH sensor can provide a feedback to a setpoint RH value, which can be used to modulate turning on or off one or more of the fans 121 as well as their speed of operation.

Figure 5:
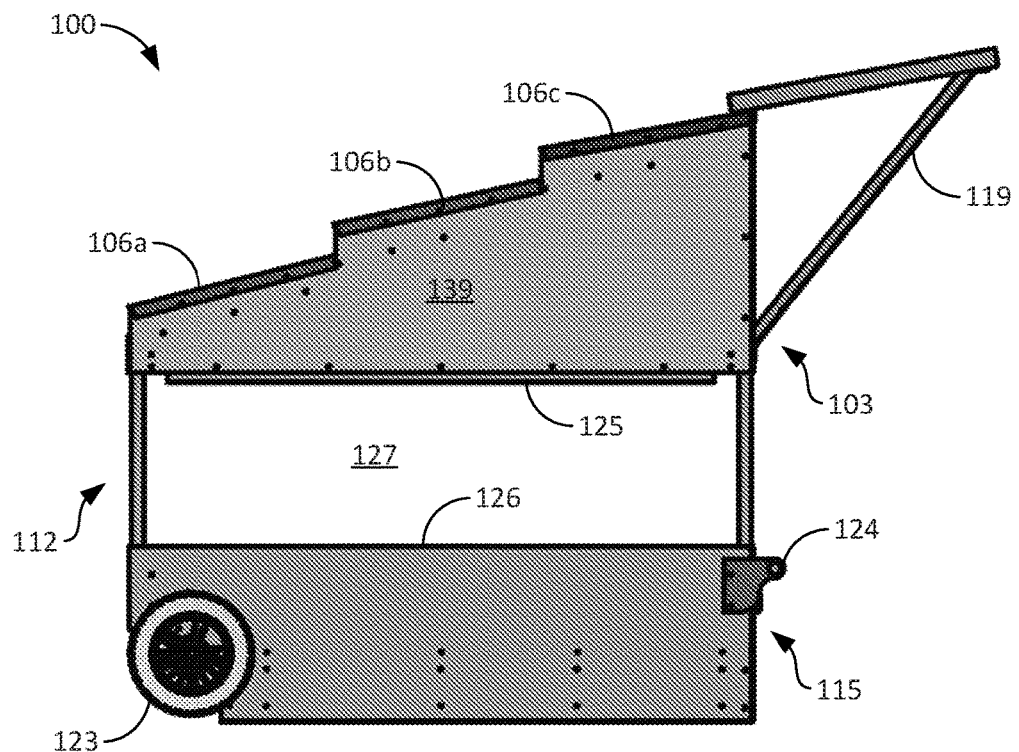
FIG. 5 is a side view of a modular scalable solar dryer of FIG. 1 according to various embodiments of the present disclosure.
Figure 6:
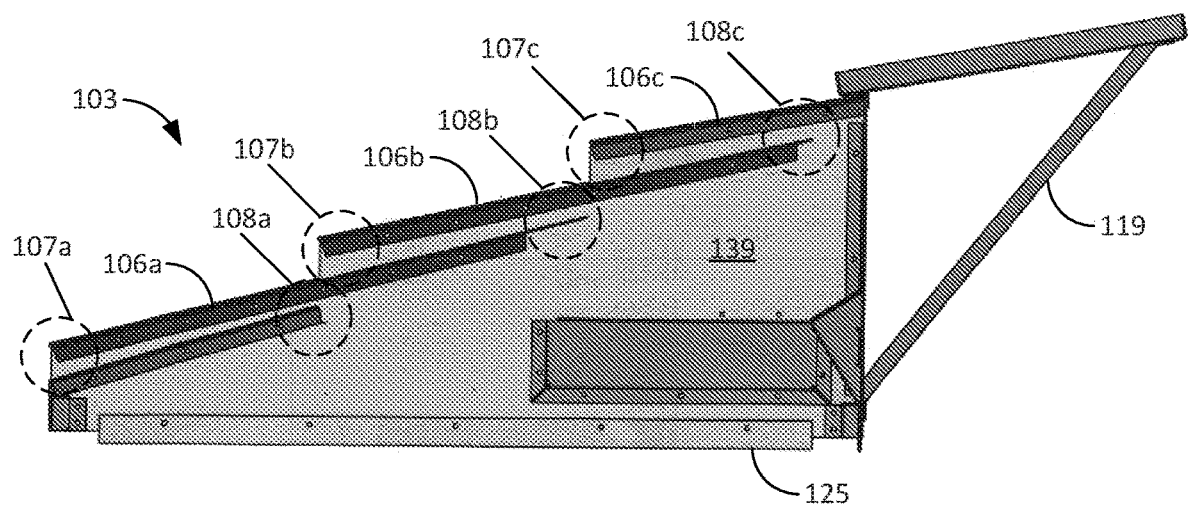
FIG. 6 is a cross-sectional view of a thermal collection unit of the module scalable solar dryer of FIG. 1 according to the first embodiment of the present disclosure.

In various embodiments, the upper thermal collection unit 103 of the solar dryer 100 includes a first substantially triangular stepped side 139*a* coupled to a second substantially triangular stepped side 139*b* via the thermal radiation collection panels 106, where an upper portion of the first substantially triangular stepped side 139*a* and the second substantially triangular stepped side 139*b* is higher than a lower portion of the first substantially triangular stepped side 139*a* and the second substantially triangular stepped side 139*b*. For example, but not limiting, the triangular stepped sides 139 can be made from sheet metal and/or reinforced plastic fiber. In some aspects, a substantially triangular stepped side 139 or other portion of the upper thermal collection unit or base can be configured to hold a battery and/or control panel. Showing more aspects of the first embodiment, FIG. 5 is a side view of the solar dryer 100 and FIG. 6 is a cross-sectional view of the upper thermal collection unit 103.

In an embodiment, the upper thermal collection unit 103 can also include a rear side 142 coupled to the first substantially triangular stepped side 139*a* and a second substantially triangular stepped side 139*b*. The rear side 142 of the upper thermal collection unit 103 can include at least one fan 121.

The upper thermal unit 103 can include a support structure 119 that can be used to mount a photovoltaic panel 133. In some aspects, a vinyl curtain 127 around the drying chamber 112 can enclose the drying chamber 112 allowing passive solar drying to enhance the drying process. In some aspects, the thermal radiation collection panels 106 can include polycarbonate, aluminum, or other suitable material and can be coated on the surface exposed to solar radiation with a suitable coating for heat absorption (for example a matte black paint layer, a non-reflective plastic coating and the like). In some embodiments, the solar dryer 100 can include a plurality of fans 121 with a high air flow. In some aspects, a 100 W solar panel with charge controller can be connected to a battery, such as a rechargeable battery. In some aspects, the drying chamber volume can be scaled up, which can also include scaling of the airflow systems based on the airflow exchange time and distribution. In some embodiments, powered exhaust fans 121 for enhanced airflow and drying. Some embodiments, can include the thermal collectors are made of steel painted black and polycarbonate material. The body of the solar dryer 100 can include reinforced plastic fiber, steel (sheet metal), a combination thereof, or other suitable material.

In some embodiments, an electronic console can be included to control operation of the fans 121. The electronic console can comprise a microcontroller, wherein the microcontroller includes a microprocessor; I/O connectors; temperature and RH sensors; Bluetooth® connectivity; USB ports for charging cell phones, iPods, iPads or other low powered electronic devices; and a touch screen or an LCD display screen to view temperature and RH measurement. In some aspects, when the solar dryer is not in use for drying, the photovoltaic panel 133 can be coupled to a DC to AC inverter with outlet accessories, and the photovoltaic (PV) power source can be used to power other loads such as irrigation pumps, household loads (lights, radio, TV, etc.).

Figure 7:
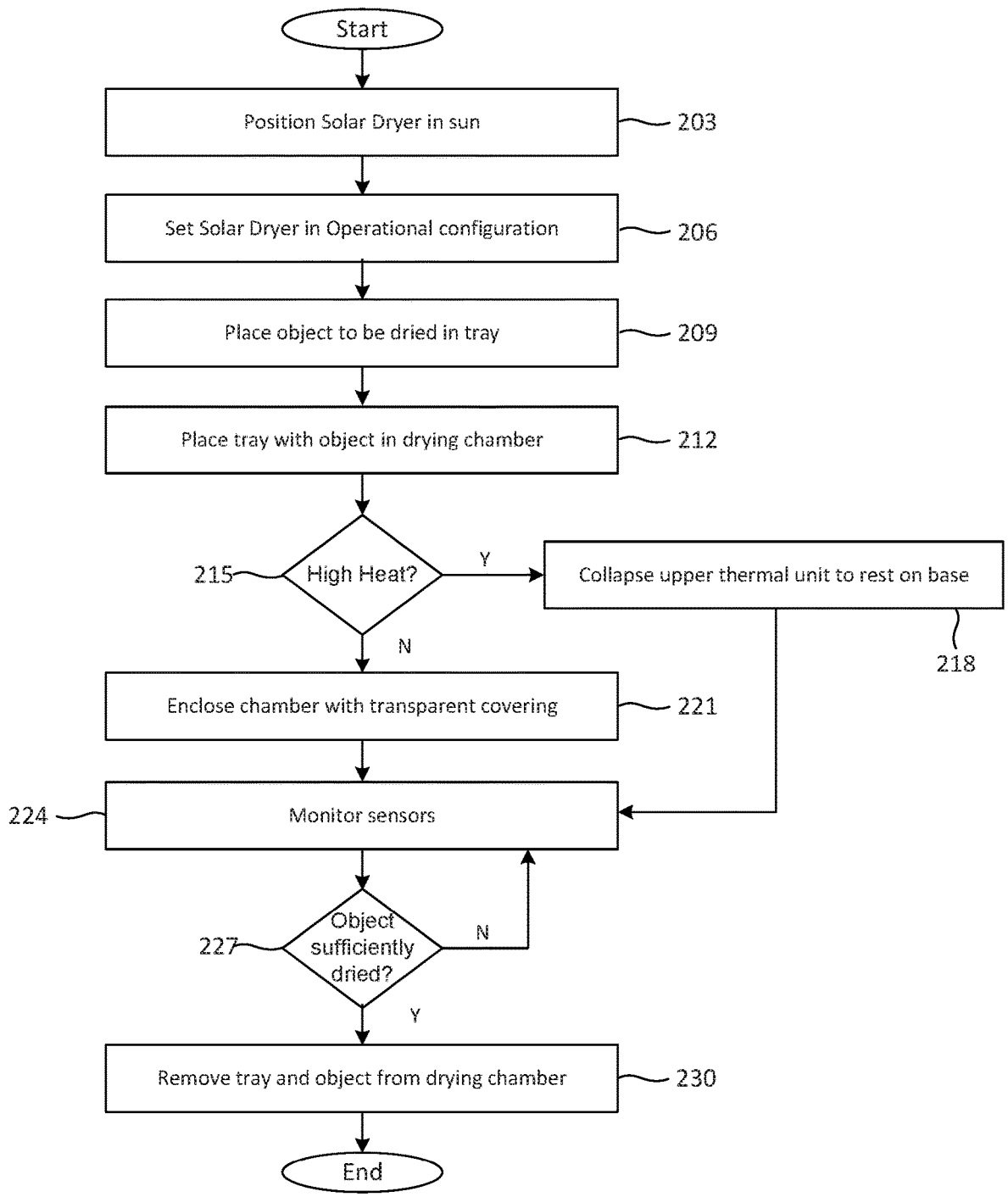
FIG. 7 is a flowchart illustrating one example of functionality of the modular scalable solar dryer according to various embodiments of the present disclosure.

As can be appreciated from the disclosure provided herein, the method for drying in the solar dryer system 100 can be an embodiment as shown in FIG. 7. A user can position the solar dryer in the sun (203). The solar dryer can then be set in operational mode to provide access to the drying chamber (206). The object or objects to be dried can be placed on a container having a perforated base and/or perforated sides and which can optionally be stacked or racked (209). The tray or trays with the object or objects can then be placed in the drying chamber (212). If it is determined that high heat mode is necessary (215), the upper thermal unit can be collapsed to rest on the base, reducing the drying chamber volume (218). If high heat mode is not necessary, the dryer will operate in normal operational mode with transparent covering enclosing the drying chamber (221). The user can monitor the sensors to evaluate drying (224). In response to the object being sufficiently dried 227, the tray and object can be removed from the drying chamber (230).

Figure 8:
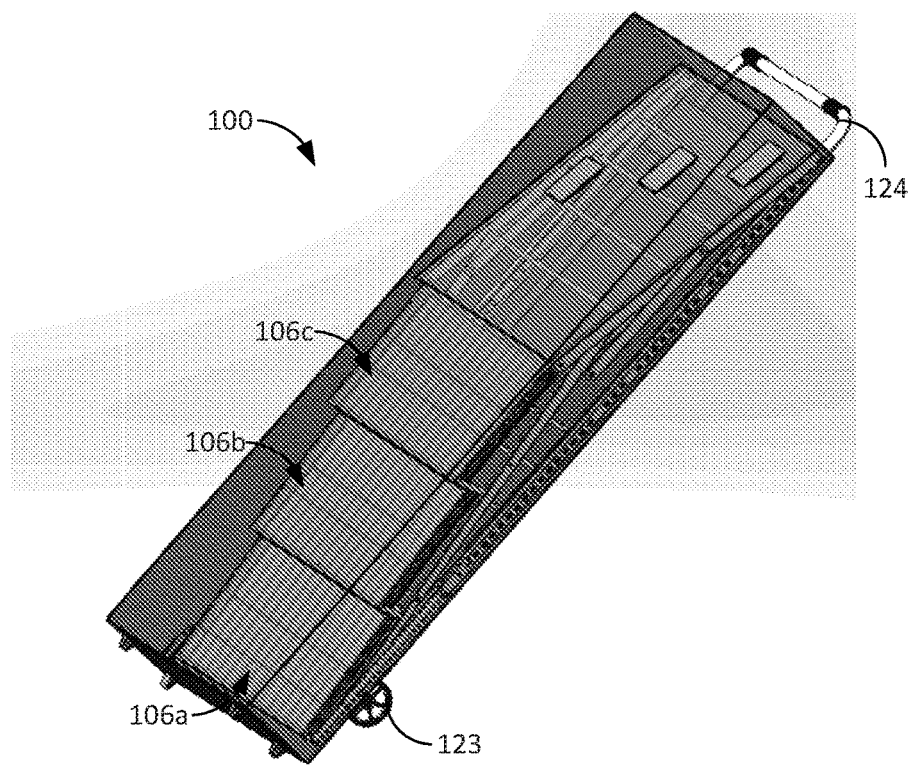
FIG. 8 is a perspective view of a second embodiment of a modular collapsible solar dryer for multipurpose drying when in stowage configuration.
Figure 9:
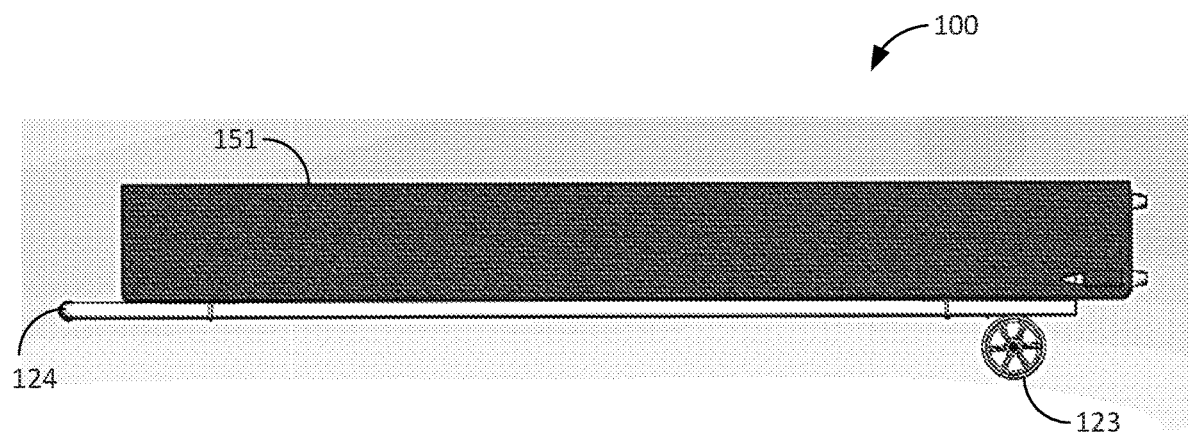
FIG. 9 is a side view of the modular collapsible solar dryer of FIG. 8 when in a stowage configuration.
Figure 10:
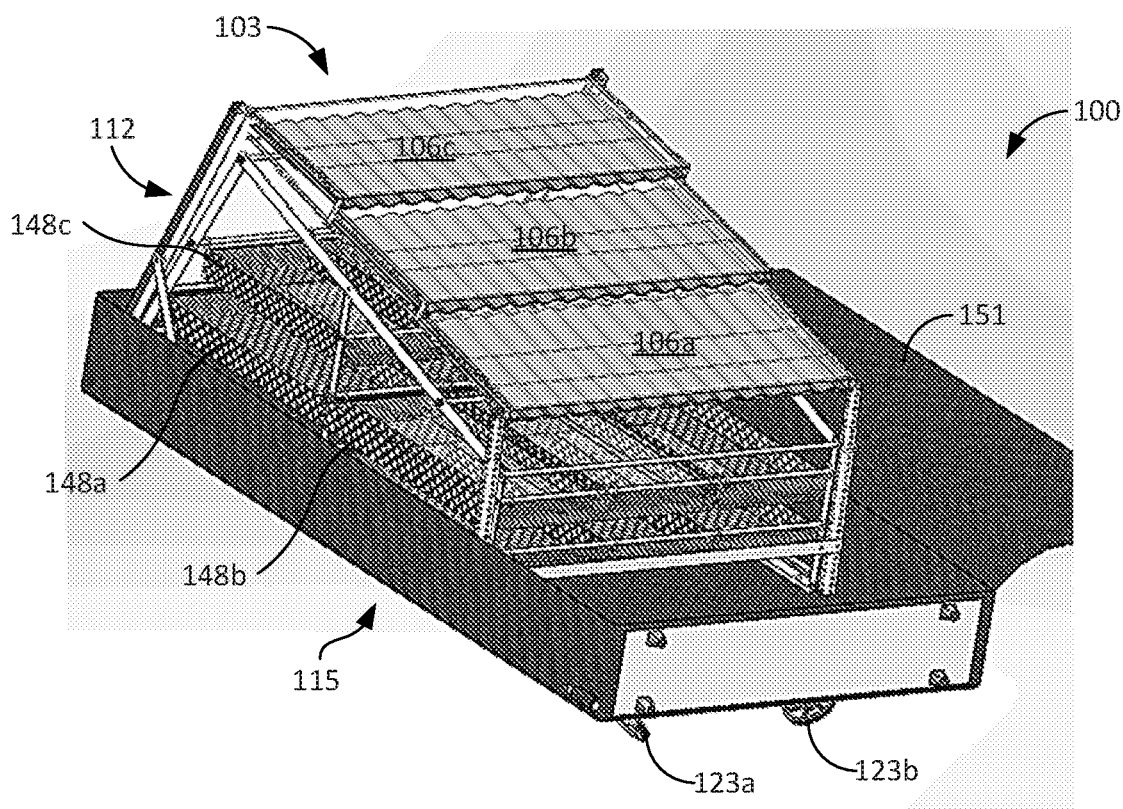
FIG. 10 is an isometric view of a front and a side of the modular scalable solar dryer of FIG. 8 according to an embodiment of the present disclosure.
Figure 11:
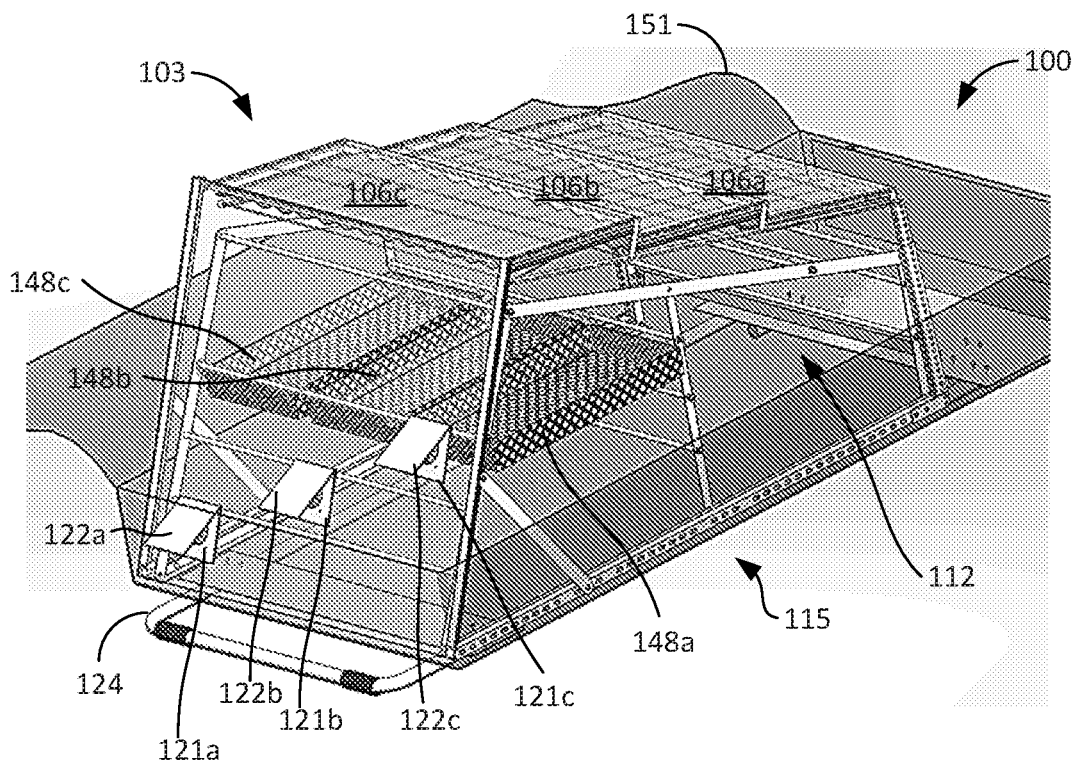
FIG. 11 is an isometric view of a back and a side of the modular scalable solar dryer of FIG. 8 according to an embodiment of the present disclosure.

In FIG. 8 and FIG. 9, illustrate another embodiment of a modular collapsible solar dryer 100 configured to collapse into a carrying case for easy stowage. FIG. 10 and FIG. 11 illustrate the embodiment in an operational configuration. The solar dryer 100 opens up and collapses into the carrying case, thus making set-up and tear-down very easy. The drying trays 148 are also foldable and flexible, such that they fold and store compactly in the carrying case 151.

An embodiment of the solar dryer 100 can be made with a frame 118 of aluminum tubing, wherein the thermal collection unit 103 is coupled to the frame 118. In some aspects, the thermal collection panels 106 can be made from a polycarbonate and aluminum black body. In some aspects, the at least one fan can be a plurality fans 121 coupled to the frame 118. In some aspects, the fans 121 can have a high air flow ranging from about 50 CFM or higher. In some aspects, the fans 121 can have a housing width of about 4 to about 5 inches or other suitable width. In some aspects, a plurality of photovoltaic panels can be used. For example, the photovoltaic panels can be coupled to a rechargeable battery. In some aspects, the fans 121 provide a powered exhaust.

In an embodiment, a solar dryer system 100, can include a collapsible frame 118, wherein the collapsible frame 118 can be any one of or a combination of tubular, circular, and square and can be made of aluminum, steel or other suitable material; one or more fans, the one or more one fans 121 can be encased within the collapsible frame 118; a power supply 130, the power supply 130 can be coupled to the frame. In some aspects, the frame 118 can be aluminum tubing.

In some embodiments, the dryer system can include a solar collector, wherein the solar collector can be coupled to the power supply 130. In some embodiments, the thermal radiation collector comprises polycarbonate, steel and aluminum sheets. In some embodiments, the thermal radiation collector consists of a black body for heat absorption (capture) and radiation. In some embodiments, the thermal radiation collector comprises an aluminum or steel sheet painted black. In some embodiments, the thermal radiation collector comprises a venturi-shaped channel to promote increased volumetric airflow rates from the inlet of the collector into the drying chamber. In some embodiments, the at least one fan comprises at least one solar powered fan.

In some embodiments, the dryer system can be configured to be flexible. In some embodiments, the dryer system can be configured to be collapsible. In some embodiments, the dryer system can be configured to be collapsible into a carrying case for portability with foldable stowing wheels 123 and handle.

In some embodiments, the dryer system includes at least one drying tray, the at least one drying tray can be configured to be exposed to the at least one fan. In some embodiments, the at least one drying tray can be flexible and configured to be folded for storage and portability. In some embodiments, the at least one drying tray can be flexible and configured to be accessed by pulling out like a drawer on rollers within the main dryer frame.

In some embodiments, the dryer system can be configured to dry agricultural materials. In some embodiments, the dryer system can be configured to dry food. In some embodiments, the dryer system can be configured to dry feed. In some embodiments, the dryer system can be configured to dry fiber crops. In some embodiments, the dryer system can be configured to dry household laundry.

In some embodiments, the dryer system includes at least one fan to exhaust air from chamber. In some embodiments, the dryer system can include at least one fan to exhaust air from chamber with closable vent cover 122 during high humidity or precipitation events. In some embodiments, the dryer system can include at least one fan to exhaust air from chamber with vent cover shaped to prevent entry of water during precipitation events. In some embodiments, the dryer system can include at least one to exhaust air from chamber, the at least one fan that can be automatically turned on upon opening of the exhaust vent cover 122.

In some embodiments, the dryer system includes a polyvinyl flexible cover 127, making a body of the dryer system. In some embodiments, the dryer system includes the at least one temperature and relative humidity sensor to measure drying chamber conditions.

In some embodiments, the dryer system includes a frame; at least one fan, the at least one fan can be encased within the frame; and a power supply 130, the power supply 130 can be coupled to the frame. In some embodiments the frame 118 comprises aluminum tubing.

In some embodiments, the dryer system includes a solar collector, the solar collector can be coupled to the power supply 130. In some embodiments, the frame 118 comprises aluminum tubing. In some embodiments, the solar collector comprises polycarbonate. In some embodiments, the at least one fan comprises at least one solar powered fan. In some embodiments, the solar collector comprises an aluminum.

In some embodiments, the dryer system can be configured to be flexible. In some embodiments, the dryer system can be configured to be collapsible. In some embodiments, the power supply 130 comprises a solar collector and at least one battery. In some embodiments, the at least one battery can be a rechargeable battery. In some embodiments, the power supply 130 comprises a solar collector and three rechargeable batteries and a charge controller.

In some embodiments, the dryer system, further comprises at least one drying tray. In some embodiments, the at least one drying tray can be flexible. In some embodiments, the dryer system can be configured to dry agricultural materials. In some embodiments, the dryer system can be configured to dry food. In some embodiments, the dryer system can be configured to dry feed. In some embodiments, the dryer system can be configured to dry fiber crops.

In some embodiments, the dryer system further comprises an exhaust. In some embodiments, the dryer system further comprises a polyvinyl flexible cover, making a body of the dryer system.

Those skilled in the art will recognize that numerous modifications can be made to the specific implementations described above. The implementations should not be limited to the particular limitations described. Other implementations may be possible.

One aspect of the disclosure encompasses embodiments of a dryer system, comprising: an upper thermal collection unit comprising a plurality of tiers of thermal radiation collection panels, wherein a vent is disposed between adjacent ones of the tiers of the thermal radiation collection panels; a chamber disposed between the upper thermal collection unit and a base, wherein the chamber is configured to receive an object for a drying process using the dryer system; and at least one fan disposed within the chamber and coupled to the base to provide circulation for the drying process.

In some embodiments of this aspect of the disclosure, the vent comprises a thermal collector inlet and a chamber inlet forming a flow channel between adjacent ones of the tiers of the thermal radiation collection panels resulting in a reduction of air pressure and increase in airflow from the chamber inlet to the chamber.

In some embodiments of this aspect of the disclosure, the at least one fan is a plurality of fans; a first subset of the plurality of fans are positioned at the backside of the solar dryer to provide a cooling effect; and a second subset of the plurality of fans are positioned at a front of the solar dryer and at a base of the solar dryer to provide a heating effect.

In some embodiments of this aspect of the disclosure, the dryer system further comprises a plurality of wheels coupled to the base to provide mobility to the dryer system.

In some embodiments of this aspect of the disclosure, the dryer system further comprises at least one transparent cover configured to enclose the chamber.

In some embodiments of this aspect of the disclosure, the thermal radiation collection panels comprise polycarbonate and aluminum black body.

In some embodiments of this aspect of the disclosure, the dryer system further comprises a power supply comprising a photovoltaic panel disposed on at least one of the plurality of tiers of thermal radiation collection panels and at least one battery coupled to the photovoltaic panel.

In some embodiments of this aspect of the disclosure, the upper thermal collection unit comprises: a first substantially triangular stepped side coupled to a second substantially triangular stepped side via the thermal radiation collection panels; and wherein an upper portion of the first substantially triangular stepped side and the second substantially triangular stepped side is higher than a lower portion of the first substantially triangular stepped side and the second substantially triangular stepped side.

In some embodiments of this aspect of the disclosure, the upper thermal unit is configured to collapse into at least a portion of the chamber to reduce a volume of the chamber.

In some embodiments of this aspect of the disclosure, the dryer system further comprises an electronic controller, the electronic controller comprising processing circuitry that: identifies a temperature and relative humidity of the chamber from a temperature and a relative humidity sensor; and controls power provided to the at least one fan based at least in part on the temperature of the chamber.

In some embodiments of this aspect of the disclosure, the dryer system further comprises a push bar handle coupled to a frame of the dryer system at an upper portion of the dryer system.

In some embodiments of this aspect of the disclosure, the dryer system further comprises at least one drying tray, the drying tray configured to be exposed to the at least one fan.

Another aspect of the disclosure encompasses embodiments of a method comprising: placing an object in a chamber of a drying system disposed between an upper thermal collection unit and a base, the chamber being configured to receive at least one object for a drying process using the dryer system, wherein the upper thermal collection unit comprises a plurality of tiers of thermal radiation collection panels, wherein a vent is disposed between adjacent ones of the tiers of the thermal radiation collection panels; controlling at least one fan disposed within the chamber and coupled to the base to provide circulation for the drying process.

In some embodiments of this aspect of the disclosure, a plurality of fans are disposed in the base of the drying system to evacuate air from the chamber and draw in air from outside the drying system through the vent and across the thermal radiation collection panels to heat the air.

In some embodiments of this aspect of the disclosure, the at least one object for drying is placed on a drying tray and exposed to at least one fan.

In some embodiments of this aspect of the disclosure, the method further comprises placing a plurality of trays containing at least one object in a stacked configuration to allow air flow to the at least one object.

In some embodiments of this aspect of the disclosure, heating is elevated by reducing the volume of the chamber.

In some embodiments of this aspect of the disclosure, the volume is reduced by collapsing the upper thermal unit into at least a portion of the chamber.

In some embodiments of this aspect of the disclosure, the method further comprises identifying at least one of a temperature measurement and a relative humidity value by at least one sensor; and controlling power provided to the at least one fan based at least in part on at least one of the temperature and relative humidity value of the chamber.

In some embodiments of this aspect of the disclosure, the operational temperature is from about 30° C. (86° F.) to about 80° C. (176° F.).

Therefore, the following is claimed:

1. A solar dryer system, comprising:
an upper thermal collection unit comprising a plurality of tiers of thermal radiation collection panels, the thermal radiation collection panels configured to heat air drawn across the thermal radiation collection panels, the thermal radiation collection panels arranged to be overlapped, inclined, and spaced to form a plurality of vents between adjacent ones of the tiers of the thermal radiation collection panels, each vent having a vent inlet and a vent outlet, each vent inlet having a larger cross-sectional area than the respective vent outlet resulting in a reduction of air pressure and increase in airflow from each vent;

a base positioned beneath the upper thermal collection unit;

a chamber disposed between the upper thermal collection unit and the base, wherein the chamber is configured to receive an object for a drying process using the solar dryer system and heated air at a top portion of the chamber from the plurality of vents of the upper thermal collection unit; and at least one fan configured to draw air from the top portion of the chamber downward through the object.

2. The solar dryer system of claim 1, wherein:
the base comprises a front side, a back side, and a bottom;
the at least one fan is a plurality of fans;
a first subset of the plurality of fans are positioned at the back side the base; and
at least one second subset of the plurality of fans are positioned at the front side of the base or at the bottom of the base.

3. The solar dryer system of claim 1, further comprising a plurality of wheels coupled to the base to provide mobility to the solar dryer system.

4. The solar dryer system of claim 1, further comprising at least one cover configured to extend from the upper thermal collection unit to the base thereby enclosing the chamber.

5. The solar dryer system of claim 1, further comprising a power supply comprising a photovoltaic panel disposed on at least one of the plurality of tiers of the thermal radiation collection panels and at least one battery coupled to the photovoltaic panel.

6. The solar dryer system of claim 1, wherein the upper thermal collection unit comprises:
a first stepped side coupled to a second stepped side via the thermal radiation collection panels configured to form the plurality of vents between adjacent ones of the tiers of the thermal radiation collection panels; and
wherein an upper portion of the first stepped side and the second stepped side is higher than a lower portion of the first stepped side and the second stepped side.

7. The solar dryer system of claim 6, wherein the upper thermal collection unit is configured to collapse into at least a portion of the chamber to reduce a volume of the chamber.

8. The solar dryer system of claim 1, further comprising an electronic controller, the electronic controller comprising processing circuitry that:
identifies a temperature and relative humidity of the chamber from a temperature sensor and a relative humidity sensor; and
controls power provided to the at least one fan based at least in part on the temperature of the chamber.

9. The solar dryer system of claim 1, further comprising a push bar handle coupled to a frame of the solar dryer system at an upper portion of the solar dryer system.

10. The solar dryer system of claim 1, further comprising at least one drying tray, the at least one drying tray disposed within the chamber.

11. A method, comprising:
placing at least one object in a chamber of a solar dryer system disposed between an upper thermal collection unit and a base, the chamber being configured to receive at least one object for a drying process, wherein the upper thermal collection unit comprises a plurality of tiers of thermal radiation collection panels, the thermal radiation collection panels arranged to be overlapped, inclined, and spaced to form a plurality of vents between adjacent ones of the tiers of the thermal radiation collection panels, each vent having a vent inlet and a vent outlet, each vent inlet having a larger cross-sectional area than the respective vent outlet resulting in a reduction of air pressure and increase in airflow from each vent to a top portion of the chamber;
controlling at least one fan disposed within the chamber to draw air from the top portion of the chamber downward through the at least one object.

12. The method of claim 11, wherein a plurality of fans are disposed in the base of the solar dryer system to evacuate air from the chamber and draw in air from outside the solar dryer system through the plurality of vents and across the thermal radiation collection panels to heat the air.

13. The method of claim 11, wherein the at least one object for drying is placed on a drying tray.

14. The method of claim 11, further comprising placing a plurality of trays in a stacked configuration to allow air flow through objects on the trays.

15. The method of claim 11, wherein reducing a volume of the chamber results in a temperature increase in the chamber.

16. The method of claim 15, wherein the volume of the chamber is reduced by collapsing the upper thermal collection unit into at least a portion of the chamber.

17. The method of claim 11, further comprising:
identifying, by at least one sensor, at least one of a temperature measurement and a relative humidity value; and
controlling power provided to the at least one fan based at least in part on at least one of the temperature measurement and the relative humidity value of the chamber.

* * * * *